Dec. 29, 1942. J. G. BEVAN 2,306,425
PRODUCTION OF FERRIC SULPHATE
Filed Jan. 7, 1939
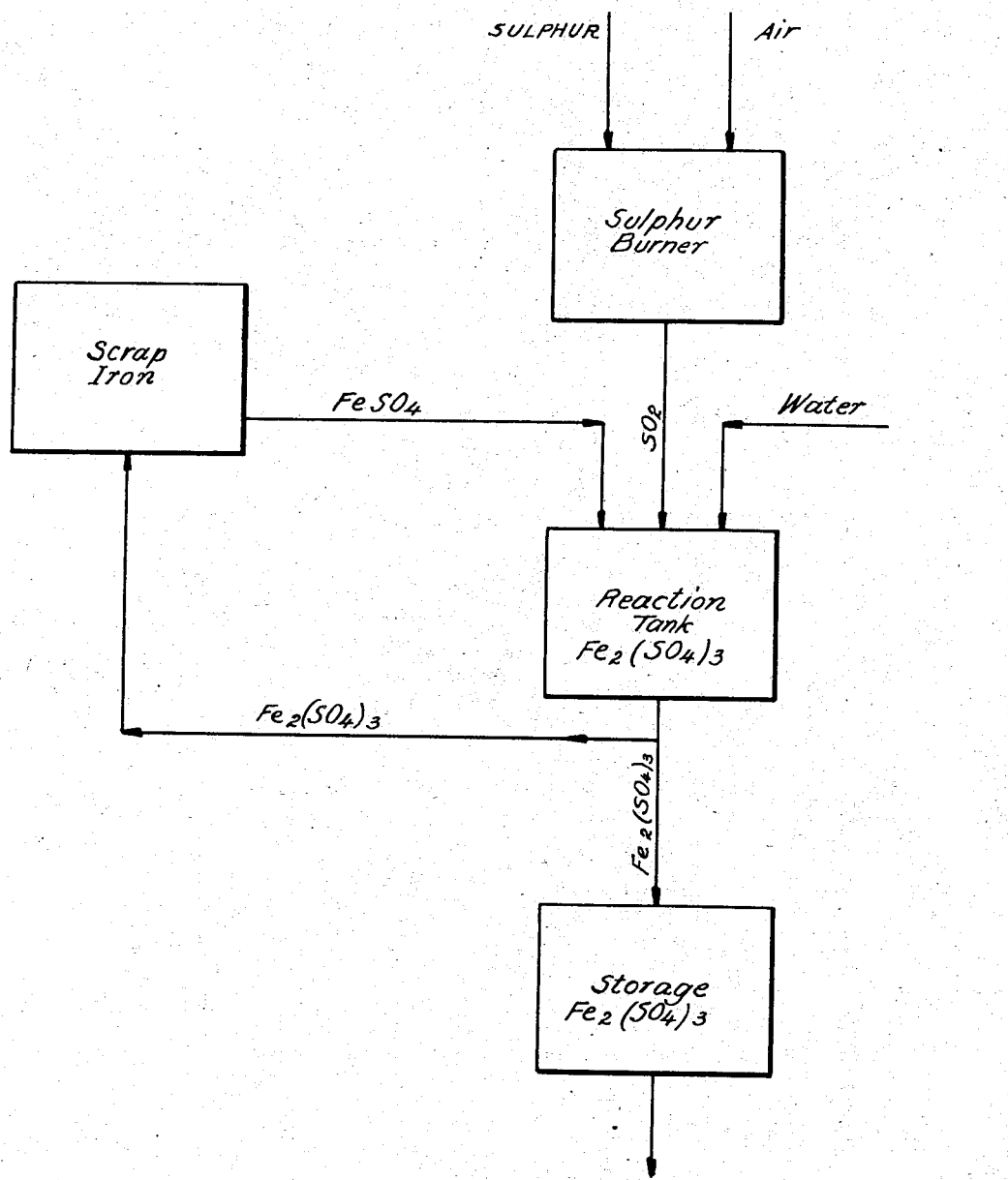
INVENTOR
John G. Bevan
BY
Pennie, Davis, Marvin and Edmonds
ATTORNEYS Patented Dec. 29, 1942

2,306,425

UNITED STATES PATENT OFFICE 2,306,425

PRODUCTION OF FERRIC SULPHATE

John G. Bevan, New York, N. Y., assignor to Guggenheim Brothers, New York, N. Y., a copartnership Application January 7, 1939, Serial No. 249,719

2 Claims. (Cl. 23—126)

This invention relates to the production of iron compounds and has for an object the provision of an improved process for producing iron sulphate. More particularly, the invention contemplates the provision of an improved process for producing ferric sulphate. A further object of the invention is to provide an improved process for utilizing sulphur dioxide, air, and scrap iron in the production of ferric sulphate.

Both metallic iron and a source of sulphur dioxide are readily available in many localities, and an efficient method for the commercial production of iron sulphate from iron and sulphur dioxide is desirable. A method for producing iron sulphate which will regenerate a reagent capable of effecting the initial oxidation of metallic iron is particularly desirable. Since the reagents used for oxidizing metallic iron usually succeed only in producing ferrous iron, the production of ferric sulphate necessitates treatment of the ferrous sulphate initially formed to cause its further oxidation to ferric sulphate, preferably without the formation of substantial quantities of sulphuric acid. I have found that ferric sulphate can be produced from metallic iron and sulphur dioxide without the need of any reagent, not produced in my process, for effecting initial oxidation of the metallic iron.

Ferric sulphate has found extensive employment in sewage treatment processes. By the process of the present invention ferric sulphate may be made available at smaller cost than heretofore, thus facilitating the widespread utilization of water purification processes, for which there is great need due to increased concentration of population and increased production of industrial wastes. The ferric sulphate, moreover, may be produced in aqueous solution substantially free from sulphuric acid, so that the solution can be used directly, without crystallization from the solution or addition of agents to neutralize acid, in sewage treatment processes requiring control of acidity.

The present invention contemplates broadly the treatment of metallic iron with a reagent capable of reacting with the iron to produce ferrous sulphate, and subjecting the ferrous sulphate thus produced to the action of sulphur dioxide and oxygen with the formation of ferric sulphate. Ferric sulphate itself, preferably in aqueous solution, is a reagent capable of reacting with metallic iron to produce ferrous sulphate, the metallic iron being oxidized to the ferrous state, and the ferric iron in the ferric sulphate being reduced to the ferrous state. Another suitable reagent capable of reacting with metallic iron to produce ferrous sulphate is sulphuric acid, from which iron will displace the hydrogen of the acid. The metallic iron may be treated with a suitable reagent such as ferric sulphate or sulphuric acid, or it may be subjected to the simultaneous action of several reagents capable of producing ferrous sulphate, for instance, by treatment with an aqueous solution containing both ferric sulphate and sulphuric acid.

Metallic iron is easily and cheaply available in the form of scrap iron, but any source of unoxidized iron may be utilized in the process of the present invention. Sulphur dioxide may be obtained from commercial gases, for instance from the gaseous products of the roasting of ores containing metallic sulphides, or it may be obtained in any other manner, as by treatment of elemental sulphur in a sulphur burner. For the simultaneous oxidation of ferrous sulphate and sulphur dioxide to form ferric sulphate, the oxygen of the air is available, but any gas, liquid or solid which contains or will release oxygen may be utilized in this reaction.

The accompanying drawing illustrates diagrammatically a preferred form of the process of the invention, in which a portion of the ferric sulphate produced by the action of sulphur dioxide and oxygen on ferrous sulphate is reacted with metallic iron to re-form ferrous sulphate. In this way, treatment of ferrous sulphate to cause the formation of ferric sulphate also serves to regenerate the reagent—namely, ferric sulphate—which effects the initial oxidation of metallic iron to the ferrous state. The process may be initiated by treatment of the metallic iron with sulphuric acid, the ferrous sulphate thus formed then reacting with sulphur dioxide and oxygen to produce the ferric sulphate for subsequent treatment of metallic iron. The method of the invention may be carried out intermittently by causing contact of batches of the reagents in suitable reaction tanks, or it may be carried out continuously by causing liquid and gaseous reagents to flow through packed towers. With either intermittent or continuous operation, the flow of the materials used in the method of the invention in its preferred form will proceed as illustrated by the drawing.

The reactions involved may be illustrated by the following chemical equations:

$$6FeSO_4 + 3SO_2 + 3O_2 = 3Fe_2(SO_4)_3$$
$$2Fe + 2Fe_2(SO_4)_3 = 6FeSO_4$$

From these equations it will appear that two thirds of the ferric sulphate produced in accordance with the first reaction is consumed in the oxidation of metallic iron in accordance with the second reaction. Thus to produce 2,000 pounds of ferric sulphate for removal from the process, 4,000 additional pounds are advantageously formed and returned to the process to replace the ferrous sulphate consumed. The two equations above may be combined into the following single chemical equation, representing the overall method of the invention:

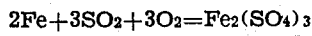

$$2Fe + 3SO_2 + 3O_2 = Fe_2(SO_4)_3$$

In one batch operation conducted as particularly illustrated in the drawing, 625 pounds of scrap iron are treated with a ferric sulphate solution obtained, for example, from previous batches. The particular solution used in this operation contains about 100 grams of ferric sulphate per liter of solution. During a retention time of two hours in the reaction vessel 560 pounds (or 90%) of the iron react with 4,000 pounds of ferric sulphate to produce 4,560 pounds of ferrous sulphate. The solution containing this ferrous sulphate (and some unreacted ferric sulphate) is removed to another reaction tank, and 2,390 gallons of water are added to the solution, so that it contains about 27.9 grams of ferrous iron per liter of solution. Then, over a period of 14 hours, 480 pounds of sulphur are caused to combine in a sulphur burner with part of the oxygen contained in 240,000 cubic feet of air, forming 960 pounds of sulphur dioxide. During the retention time of 14 hours the gases leaving the sulphur burner, which contain about 2.5% sulphur dioxide and 18.4% uncombined oxygen, are thoroughly mixed with the solution containing ferrous sulphate, causing oxygen and the sulphur dioxide to dissolve in the solution and react therein with the ferrous sulphate to produce 6,000 pounds of ferric sulphate in 27,300 liters or 7,200 gallons of solution. This resulting solution contains about 100 grams per liter of ferric sulphate and has a specific gravity of 1.0854. An amount of this solution containing one ton of ferric sulphate goes to storage as the product of the operation, while the remaining solution is returned to the reaction vessel containing scrap iron to supply the ferric sulphate needed to produce the next batch of ferrous sulphate solution. The returned solution contains 4,000 pounds of ferric sulphate produced by reaction of ferrous sulphate, sulphur dioxide, and oxygen, and, in addition, the unreacted ferric sulphate originally present in the ferrous sulphate solution removed from the reaction vessel containing scrap iron; the 4,000 pounds of ferric sulphate first mentioned will react with metallic iron to regenerate 4,560 pounds of ferrous sulphate in the next batch operation.

The invention, in a preferred form, utilizes a packed tower containing metallic iron. The iron may be distributed throughout the tower, or the lower portion of the tower may be packed only with material which does not participate in the reactions, the iron being confined to the upper portion of the tower. An aqueous solution of ferric sulphate, or, initially, dilute sulphuric acid, is passed downwardly through the tower, and reacts in the upper portion of the tower with the iron to form ferrous sulphate. As the resulting ferrous sulphate solution flows through the lower portion of the tower, it encounters a mixture of air and sulphur dioxide which is introduced at the bottom of the tower, and sulphur dioxide, oxygen of the air, and ferrous sulphate react to form ferric sulphate. A portion of the ferric sulphate solution leaving the bottom of the tower, large enough to replace the solution previously consumed by reaction with metallic iron, is pumped back to the top for reaction with iron to form more ferrous sulphate. To prevent a continual increase in the concentration of the solutions flowing through the tower, water is added. Ferric sulphate solution may be continuously removed from the process and water continuously added to the circulating solution until the iron packed in the tower needs replenishing.

In a preferred and complete form of the process of the invention, a series of packed towers is used, and the towers are connected by suitable conduits and pumps, so that solution leaving the bottom of one tower enters the top of the next tower, from the top of which gases are conducted to the bottom of the first-mentioned tower. Thus, ferric sulphate solution entering one end portion of the series flows down through each tower in succession to the opposite end portion of the series, while gases containing sulphur dioxide and oxygen, admitted at that opposite end portion of the series, flow up through each tower in succession counter-currently to the solution until the unreacted gases leave the series of towers at the first end portion. A portion of the solution leaving the one end portion of the series of towers is returned to the other end portion. Every tower in the series may contain metallic iron, or the ferric sulphate solution, which has undergone reaction with iron to form ferrous sulphate, may pass through one or more towers containing only non-reactive packing material before leaving the series of towers. The mixture of gases, depleted in oxygen and sulphur dioxide, need not be passed through the tower or towers on the end portion into which the ferric sulphate solution is introduced. The ferric sulphate in the solution first reacts with iron to form ferrous sulphate, which then encounters the air and sulphur dioxide, causing the formation of more ferric sulphate than originally entered the series of towers.

Water may be introduced anywhere along the series of towers, and provision may be made to dilute the solutions in the towers by adding water at various stages of the operation and thus control the concentration of the solutions. The relative concentration of oxygen and sulphur dioxide in the gases can, of course, be controlled by diluting the sulphur dioxide-containing gas with varying quantities of air. An extra tower may be provided, and the piping and valves may be so arranged that one tower can be substituted for another; in this way, as the iron packed in each tower becomes exhausted, it may be immediately replaced by a freshly packed tower, and the exhausted tower then replenished and held in readiness to replace the next tower which becomes exhausted.

The quantities of materials hereinbefore mentioned for the production of one ton of ferric sulphate and the regeneration of the ferrous sulphate consumed are the amounts of materials required when the reaction of ferrous sulphate, sulphur dioxide and oxygen to produce ferric sulphate proceeds substantially to completion. In the example given an excess of air is admitted to the sulphur burner, so that the gases for reaction with ferrous sulphate contain so much oxygen that only about 14% of the oxygen left after burning the sulphur is required for the reaction with ferric sulphate and sulphur dioxide. The gas supplied for this reaction contains sulphur dioxide and oxygen in a molecular ratio of 0.136 to one.

When the method of the invention is carried out commercially, however, it is impractical to convert all the ferrous sulphate formed into ferric sulphate and at the same time avoid the formation of appreciable quantities of sulphuric acid. The following table will indicate the dependence of sulphuric acid formation on the ratio of moles of sulphur dioxide to moles of oxygen in the gas supplied for reaction with ferrous sulphate, and also the dependence of sulphuric acid formation on the extent to which oxidation of ferrous sulphate to ferric sulphate approaches completion:

| Strength of entering solution, grams ferrous iron per liter | Air | $SO_2$ in air | Ratio, moles $SO_2$ to moles $O_2$ | Finished product | | |
|---|---|---|---|---|---|---|
| | | | | Ferrous iron | Ferric iron | $H_2SO_4$ |
| | Cubic feet per minute | Per cent | | Grams per liter | Grams per liter | Grams per liter |
| 29.4 | 15 | 1.5 | .077 | 1.0 | 28.4 | 1.5 |
| 30.2 | 15 | 1.2 | .061 | 0.4 | 29.4 | 1.0 |
| 30.2 | 15 | 1.2 | .061 | 4.96 | 25.4 | None |
| 21.86 | 25 | 2.06 | .109 | 4.23 | 17.63 | None |
| 26.6 | 23.7 | 3.9 | .229 | 1.77 | 24.83 | 5.6 |
| 28.2 | 28 | 4.0 | .237 | 2.36 | 25.86 | 6.6 |
| 33.0 | 15 | 4.4 | .267 | 7.7 | 25.3 | 9.5 |

In the reaction of ferrous sulphate with sulphur dioxide and oxygen, the oxygen serves not only to oxidize sulphur from its valence in sulphur dioxide (or sulphite) to its valence in sulphate, but also to oxidize the iron in ferrous sulphate so that it can combine with the sulphate sulphur thus formed. If, however, only a very small concentration of ferrous iron is present, very little ferric iron can be formed, and the oxidized sulphur dioxide can not combine with oxidized iron to form ferric sulphate. Under these conditions oxidized sulphur dioxide will react with water to form sulphuric acid. Therefore, sulphuric acid production will apparently be decreased by maintaining an appreciable concentration of ferrous sulphate in the solution leaving the reaction tank or the packed towers, as indicated by the upper sets of figures in the above table. In the preferred form of the process of the invention this may be accomplished by placing more metallic iron in the towers near the gas entrance end portion of the series of towers, or by increasing the rate of flow of, or by decreasing the concentration or amount of, the gases entering the series of towers. It is evident from the above table that, if the ferrous sulphate solution is removed from contact with the gases containing sulphur dioxide and oxygen when about five-sixths of the iron in the solution have been oxidized to the ferric state, substantially complete elimination of sulphuric acid from the product may be achieved.

Even though much of the ferrous sulphate remains unoxidized to ferric sulphate in the towers, a high relative concentration in the entering gases of sulphur dioxide to oxygen will also cause formation of sulphuric acid, as is indicated by the lower sets of figures in the above table. In this way a product is obtained containing substantial quantities of ferric sulphate, ferrous sulphate, and sulphuric acid. It seems that, in order to prevent the formation of sulphuric acid, the air and sulphur dioxide must be so regulated that the solution in the towers does not absorb sulphur dioxide at a faster rate than it absorbs the oxygen of the air. When the solution contains sulphur dioxide in excess of the amount equivalent to the oxygen in the solution, all of the sulphur dioxide can not react with oxygen and ferrous sulphate to form ferric sulphate, even though the solution contains more than sufficient ferrous sulphate for this reaction. It is then possible that the sulphur dioxide, in solution in excess of oxygen, tends to react instead with ferric sulphate and water of the solution, reducing the ferric iron to the ferrous state and itself being oxidized to sulphuric acid. To prevent the formation of sulphuric acid by limiting the absorption of sulphur dioxide relative to oxygen, the gases entering the towers may be diluted with air, or less sulphur may be burned if the source of the sulphur dioxide is a sulphur burner, these procedures tending to decrease the ration of moles of sulphur dioxide to moles of oxygen in the gases. When the ratio of moles of sulphur dioxide to moles of oxygen in the gases to be brought into contact with the ferrous sulphate solution is between about 0.05 and 0.15, the formation of substantial amounts of sulphuric acid will be inhibited, and when in addition a suitable amount of ferrous sulphate remains unoxidized as recommended above, the product will be obtained substantially free of sulphuric acid.

Whether or not the theories advanced to explain the formation of sulphuric acid are correct, its formation may be substantially avoided by lowering the ratio of moles of sulphur dioxide to moles of oxygen in the entering gases, or by stopping the reaction before all of the ferrous iron has been converted to the ferric state, or by resorting to both expedients. With this information one skilled in the art to which this invention appertains will be enabled to produce solutions containing ferric sulphate but very little ferrous sulphate or sulphuric acid; solutions containing ferric sulphate, widely varying quantities of ferrous sulphate, but substantially no sulphuric acid; solutions containing ferric sulphate, widely varying quantities of sulphuric acid, but substantially no ferrous sulphate; and solutions containing ferric sulphate and widely varying quantities of both ferrous sulphate and sulphuric acid. Whatever the product, a portion of it may be utilized for reaction with metallic iron to replace the ferrous sulphate consumed during the formation of the desired product.

I claim:

1. The method of producing ferric sulphate which comprises passing an aqueous solution of ferric sulphate downwardly through a packed tower containing metallic iron to reduce the iron of the ferric sulphate and oxidize metallic iron with the production of a solution of ferrous sulphate in the upper portion of the tower, passing gases containing sulphur dioxide and oxygen upwardly through the tower in contact with the downwardly flowing solution to oxidize the ferrous sulphate contained therein and produce a solution of ferric sulphate in the lower portion of the tower, withdrawing ferric sulphate solution from the lower portion of the tower, and returning to the upper portion of the tower for downward flow in contact with the metallic iron remaining therein portions of the withdrawn ferric sulphate solution large enough to replace the solution previously consumed by reaction with metallic iron.

2. The method of producing ferric sulphate which comprises introducing an aqueous solution initially containing ferric sulphate into an end portion of a series of packed towers at least one of which contains metallic iron for downward flow of the solution through each of the towers in series, introducing gases containing oxygen and sulphur dioxide into the opposite end portion of the series of towers for upward flow through at least one of the towers in the series in contact with downwardly flowing solution therein, the operation being controlled to effect reduction of ferric sulphate initially contained in the solution introduced into the series of towers to ferrous sulphate with simultaneous oxidation of metallic iron to ferrous sulphate, and subsequent oxidation of the ferrous sulphate thus produced to ferric sulphate, withdrawing ferric sulphate solution from the gas entrance end portion of the series of towers, and returning to the first-mentioned end portion of the series of towers portions of the withdrawn ferric sulphate solution large enough to replace the solution previously consumed by reaction with metallic iron.

JOHN G. BEVAN.